US010565092B2

(12) United States Patent
Benes et al.

(10) Patent No.: US 10,565,092 B2
(45) Date of Patent: Feb. 18, 2020

(54) ENABLING ATTRIBUTES FOR CONTAINERIZATION OF APPLICATIONS (71) Applicant: Red Hat, Inc., Raleigh, NC (US)

(72) Inventors: Eduard Benes, Brno (CZ); Matus Marhefka, Brno (CZ)

(73) Assignee: Red Hat, Inc., Raleigh, NC (US)

(*) Notice: Subject to any disclaimer, the term of this patent is extended or adjusted under 35 U.S.C. 154(b) by 163 days.

(21) Appl. No.: 15/727,320

(22) Filed: Oct. 6, 2017

(65) Prior Publication Data

US 2019/0108116 A1 Apr. 11, 2019

(51) Int. Cl.
G06F 11/36 (2006.01)
G06F 11/07 (2006.01)
G06F 11/30 (2006.01)
H04L 29/08 (2006.01)
G06F 9/455 (2018.01)

(52) U.S. Cl.
CPC ...... *G06F 11/3664* (2013.01); *G06F 11/0712* (2013.01); *G06F 11/301* (2013.01); *G06F 9/455* (2013.01); *G06F 11/3006* (2013.01); *H04L 67/10* (2013.01)

(58) Field of Classification Search
None
See application file for complete search history.

(56) References Cited

U.S. PATENT DOCUMENTS

| 7,107,174 | B2 | 9/2006 | McGrath et al. | |
| 7,299,382 | B2 | 11/2007 | Jorapur | |
| 7,904,886 | B2 | 3/2011 | Dufour et al. | |
| 8,429,459 | B2 | 4/2013 | Birakoglu et al. | |
| 8,438,545 | B1 | 5/2013 | Almog et al. | |
| 2015/0142878 | A1* | 5/2015 | Hebert | H04L 67/10 709/203 |
| 2016/0092339 | A1 | 3/2016 | Straub et al. | |
| 2017/0124320 | A1* | 5/2017 | Fojtik | G06F 21/53 |

(Continued)

FOREIGN PATENT DOCUMENTS

WO    WO2016159949    10/2016

OTHER PUBLICATIONS

Tehranian, "How Should I Get Application Configuration Into My Docker Containers?", Mar. 25, 2015, 10 pages https://dantehranian.wordpress.com/2015/03/25/how-should-i-get-application-configuration-into-my-docker-containers/.

(Continued)

*Primary Examiner* — Philip Wang
(74) *Attorney, Agent, or Firm* — Lowenstein Sandler LLP (57) ABSTRACT Implementations of the disclosure include a framework to provide an optimal execution environment for applications in software containers. In one implementation an apparatus is provided that includes a memory to store a plurality of application containers and a processing device coupled to the memory. The processing device is to identify an application to execute in a container associated with a first environment. A monitoring component is injected into the first environment to collect event data associated with an interaction of the application with one or more system resources. Using the collected event data, an indication of a restraint on an execution of the application is identified. Thereupon, one or more attributes are generated to update the application container to execute the application in a second environment in view of the restraint.

20 Claims, 5 Drawing Sheets

(56) References Cited

U.S. PATENT DOCUMENTS

| | | | | |
|---|---|---|---|---|
| 2017/0257424 | A1* | 9/2017 | Neogi | H04L 43/16 |
| 2017/0315795 | A1* | 11/2017 | Keller | G06F 8/63 |
| 2018/0089068 | A1* | 3/2018 | Bhojan | H04W 4/50 |
| 2018/0336123 | A1* | 11/2018 | Benes | G06F 11/3692 |
| 2018/0336351 | A1* | 11/2018 | Jeffries | G06F 21/566 |

OTHER PUBLICATIONS

Souppaya et al., "Application Container Security Guide", Computer Security Division Information Technology Laboratory; Twistlock Baton Rouge, Louisiana; Scarfone Cybersecurity Clifton, Virginia, Apr. 2017, 56 pages http://csrc.nist.gov/publications/drafts/800-190/sp800-190-draft.pdf.

Sun et al., "Improve Software Testing with Containers", www.enjoytesting.cn, Jun. 2017, 4 pages http://www.methodsandtools.com/archive/containertesting.php.

\* cited by examiner

ENABLING ATTRIBUTES FOR CONTAINERIZATION OF APPLICATIONS

TECHNICAL FIELD

The implementations of the disclosure relate generally to computing infrastructures and, more specifically, relate to enabling attributes for containerization of applications.

BACKGROUND

Containerization is an operating-system-level virtualization environment for running multiple isolated software containers on a single host machine. It is an alternative to full machine virtualization that involves encapsulating a process into a container with its own operating environment. Some containerization technologies allow each container to run on the "bare metal" of a host machine while also being able to access a shared instance of a host operating system.

BRIEF DESCRIPTION OF THE DRAWINGS

The disclosure can be understood more fully from the detailed description given below and from the accompanying drawings of various implementations of the disclosure. The drawings, however, should not be taken to limit the disclosure to the specific implementations, but are for explanation and understanding only.

The disclosure is illustrated by way of examples, and not by way of limitation, and may be more fully understood with references to the following detailed description when considered in connection with the figures, in which.

DETAILED DESCRIPTION

A "container" is an execution environment that is isolated from other execution environments and processes running on the system. In an illustrative example, a container may be represented by an isolated process in the user space of the host operating system, and may share the operating system kernel with other containers. The term "application" is used to refer to any combination of software and hardware products that may perform a desired function. An application may be a single (or multiple) software program that operates with a hardware platform. Many Platform-as-a-Service (PaaS) systems, such as OpenShift™, utilize containers to provide certain services to clients. A PaaS system provides a platform and environment that allows clients to build and test applications and services over the Internet. Although implementations of the disclosure are described in accordance with a certain type of PaaS system, this should not be considered as limiting the scope or usefulness of the features of the disclosure.

The PaaS system allows the applications to run in a container using a container image that can be built by using containerization tools (e.g., Docker™) or other types of containerization technologies. A container image can include information that relates to an executable code that is to be deployed in the container when launched, and information that relates to the functionality of the executable code. For example, a developer using the PaaS system can execute a command to build a container image, validate functionalities of the container image, and then publish the container image into a registry. Other operators (e.g. users or systems) of the PaaS system can download container images from the registry to instantiate respective containers in a particular system environment. A registry can refer to a repository (e.g., data store) of container images that is accessible by operators to retrieve a container image to launch a container in a respective production environment. For example, the production environment may include a computer system in which the application (or other executable code) of the container is executable during actual use of the application by an end user.

There are, however, several unaddressed issues that can occur when executing an application within the containers in the production environment (e.g., of the PaaS system). This can be due to certain system limitations or design decision made by the developer of the container and/or application there within. For example, there may be certain issues not addressed or taken into consideration during the containerization of an application, but are later exposed in certain situations. These situations may include, for example, any issues related to deploying a tested application into production, issues related to the software application design/development when applying containerization restraints on the application and also use case issues that may occur when the application is originally developed in a container amongst other type of situations. Another possible unaddressed issue that can occur is that the container used in production is stateless in that the data of the container is lost if the host is shutdown or otherwise powered off. In such cases, the application designer may need to ensure that the application can store some static data so that it is not lost, such as using storage mounts from a network or the host system into a container. Other possible issues may be related to the lack of testing or an insufficient test coverage used by the application designer. In such cases, the containerized application may not display any issues in a testing environment due to using basic functional tests/default configuration. The application, however, deployed into the production environment may encounter some fault or unexpected limitation due to a previously un-triggered functionality, code execution path, production environment configuration for the application and etc. This type of situation may be caused by some limitation of the containerization technology that was applied to the application running inside a container was not triggered in the testing environment. When these and other types of situations are not taken into account by the application designer, the unaddressed issues that occur can adversely impact regression testing of the application after its containerization leading to significant development delays of applications for end users of the system.

Implementations of the disclosure address the above-mentioned and other deficiencies by providing a framework to determine an optimal execution environment for applications in software containers. The framework allows the developers to be able to address various corner cases or limitations in advance (or during deployment) and make decisions regarding how or if an application should be containerized in production. The framework may include an application also referred to as a "test manager" component to run in the PaaS system and a "test controller" that is triggered by test manager which has full control over the test controller. Test manager is a component that manages how test controller is installed and triggered to active on each host. The test controller, when triggered, can put a particular application under test in a "monitoring mode" to simulate an execution of the application in a partially containerized environment and gather data regarding this execution. One advantage of the framework is that it allows the developer to gradually introduce levels of isolation or restrictions on the application under the test to expose any possible issues (e.g., corner cases) with running the application in production. Moreover, by using and re-using the stored execution tests, the framework is more likely to collect relevant data regarding the corner cases and is less prone to manual error.

To put a particular application under test, the test manager component may install and configure a testing environment (such as a virtual machine, a physical machine, memory partition, etc.) to include the test controller. For example, the test manager component may generate a testing environment on a host machine to isolate an execution of the application. The test controller may include a monitoring component that is injected in the environment to gather data about the particular application for containerization. For example, the test controller containing the monitoring component may be injected into the same container as the application, or test controller may be placed into another container (e.g., other than the application's container) on the host system when application is providing network service and therefore can be monitored through the network. In some implementations, the test controller may be executed outside of the testing container but has the ability to control the processes running within the container. To control processes running in a container, test controller may use an utilizing mechanism (such as an API call) provided by the containerization technology to control the processes running within a particular container or some type of kernel level API of the host system that can control what processes on the host system can be executed by the processes running within the container.

To monitor processes executing within the container, the monitoring component may, for example, intercept system calls made by the processes. Through system calls, the monitoring component may gather data about the particular application for containerization. For example, the intercepted system calls may indicate which devices and files are accessed (including network sockets to determine if the app uses network and in what way). The monitoring component may also intercept certain inter-process communications (IPC) and determine which operating system capabilities are needed for the application based on the intercepted system calls. In this regard, as containerization restrictions are applied in the testing environment, the framework can detect various issues by examining the intercepted system calls which may return informative exit codes defined by the operating system.

After the application is deployed in the testing environment, the test controller may execute the application in a "monitoring mode" where the monitoring component is injected into the testing environment to intercept events and gather data related to how the application interacts with, for example, underlying system resources (e.g., I/O devices, memory, processor or network allocations, etc.). In some implementations, the test controller receives a plurality of execution tests to apply to the application. The execution tests may be stored in a data structure or individual application modules that are used to evaluate, for example, the execution of a new release of the application. These execution tests are used to identify a range of events (e.g., a change of system state, a change of a value of at least one state variable of the system, etc.) that indicate the applications behavior (e.g., interactions with the system resources) in the test environment with the application's production behavior. The events may include the application's behavior with regard, but not limited to, a list of system calls, devices, files and other resources accessed by the application, whether the application utilizes a filter for system calls, whether the application limits or modifies system resources, whether the application uses a type of MAC (Mandatory Access Control) to access certain resources or whether system user or group identifiers are used as well as other type of events.

Data for the events gathered by the monitoring component is later used as an input for the test controller to determine whether the application can be containerized or to implement further modifications to the testing environment to test the application. For example, the event data gathered by the monitoring component may indicate that there were one or more unexpected issues or breaks related to an execution of the application during the test because of a restraint on the application. The restraint may be one or more system resources the application was not able to reach due to the isolation features implemented in the container of the testing environment. In some implementation, the monitoring component may collect data relevant that is specific for the application during a simulated application run. Outcome of test execution may include test logs and an "application monitoring report," which can be reviewed via a graphical interface such as a Web browser.

Based on gathered event data, the framework may generate one or more attributes to update the environment for executing the application and/or the containerization options for containers to be executed in the environment. For example, the framework uses the gathered data to generate attributes for reconfiguring the testing environment of the test controller. These attributes may indicate whether the test controller should run inside the same container executing the application or outside a running container but with full ability to control processes running within the container using, for example, an type of API call to control processes running within a container. For example, the framework may determine based on the gathered data that the application is sharing data with another container/VM/host system etc. As such, the test controller should be run outside of the container executing the application so that the monitoring component can intercept events regarding the shared data. In some implementations, the test manager may reconfigure the test controller to further simulate the application's production behavior. Based on the gathered event data, the test controller may configured the monitoring component to collect what additional related data or the test controller may introduce some more partial isolation features (such as restricting certain resource access) in the testing environment of the application. The additional isolation features may simulate situations that may be later implemented by a containerization tool (e.g., Docker™) in production.

In some implementations, the reconfiguration adjustments may reveal an unexpected issue or a restraint on the execution of the application. For example, the restraint may be a system resource that the application needs to access via the container otherwise it may fail or break during execution when containerized. In such cases, the test controller may generate one or more attributes (e.g., containerization settings) to update the configuration of the application container for executing the application. For example, the test controller may determine which of the attributes can be used to remove the restraint on the execution of the application without violating some system policy related to underlying host system. As such, these updates to the application container that are implemented based on the attributes may avoid the unexpected issue by removing the restraint on the application executed therein.

The generated attributes, in other implementations, may also provide certain containerization options indicate an optimal container for executing the application. These containerization options may include, a first containerization option for generating a (normal) container for the application that includes application specific configurations, a second containerization option for generating a (privileged) container for the application that may be fully privileged also referred to as a Super-Privileged Container (SPC) with full system privileges (e.g., extended user/system privileges) to overcome the limitations or partially privileged with certain selected limitation as allowed by the containerization technology, or a third containerization option (no container) indicating that the application should not be executed within a container. In some situations, the application may need certain extended user/system privileges that are not allowed because they may open a security flaw or cause an undesirable impact on the underlying host system. In such cases, it may be better that the application and/or the whole testing process is moved into an isolated environment in a fully virtualized (or bare metal) machine.

Figure 1:
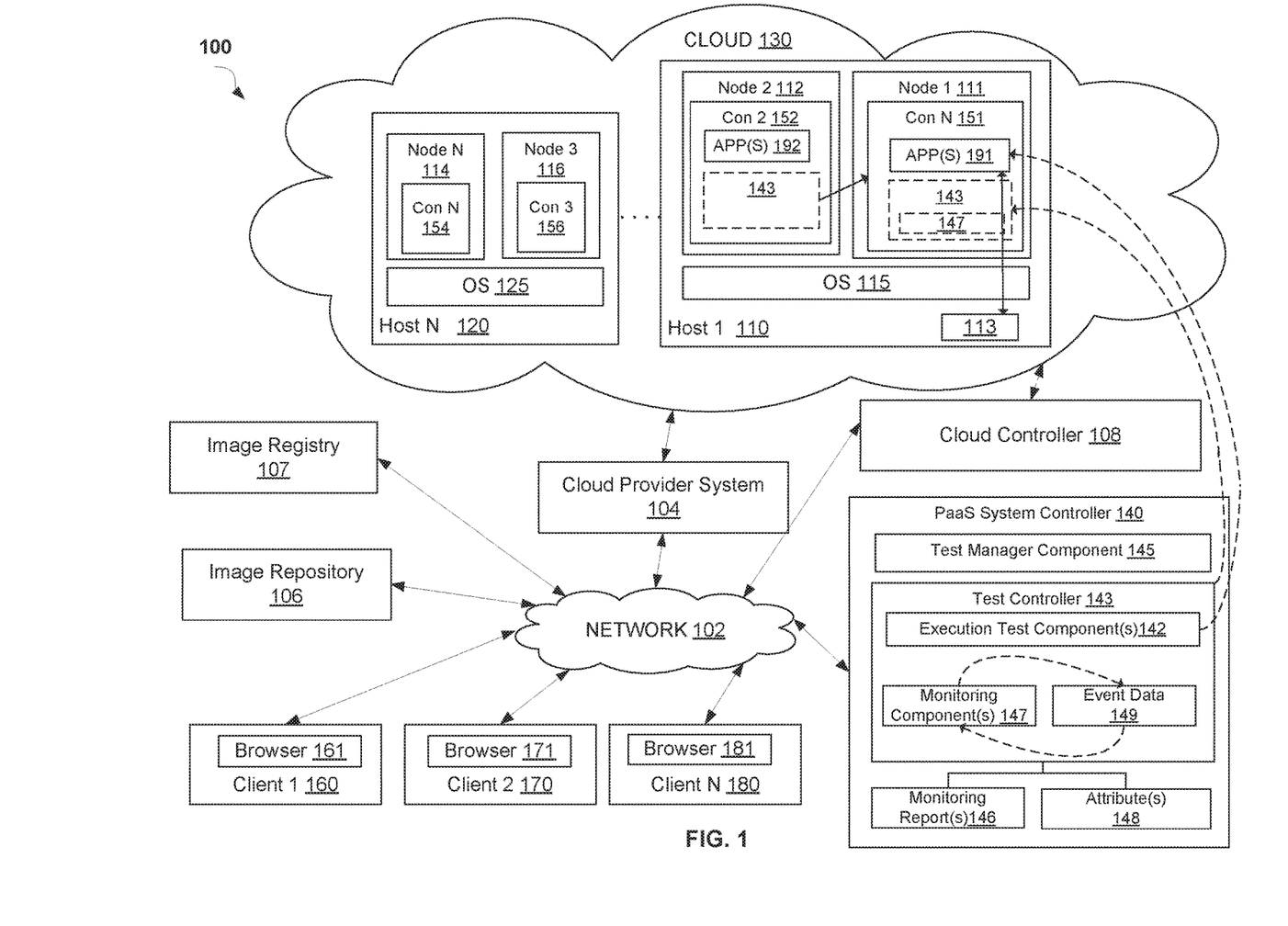
FIG. 1 is a block diagram of a computer system to enable attributes for the containerization of applications according to an implementation of the disclosure.

FIG. 1 is a block diagram of a processing system 100 that may be used to enable attributes for containerization of applications in accordance with one or more aspects of the present disclosure. As shown in FIG. 1, system 100 includes a cloud 130 managed by a cloud provider system 104. The cloud provider system 104 provides nodes 1 through N 111, 112, 114, 116 to execute software and/or other processes. A "node" 111, 112, 114 or 116 may refer to a VM or a physical machine, a memory partition, or any other type of computing environment and provide a full or partially isolated execution environment for the execution of an application. In some implementations these nodes are virtual machines (VMs) that are hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. When nodes 111, 112, 114, 116 are implemented as VMs, they may be executed by operating systems 115, 125 on each host machine 110, 120.

In some implementations, the host machines 110, 120 are often located in a data center. Users can interact with applications executing on the cloud-based nodes 111, 112, 114, 116 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

The cloud provider system 104, in an implementation, is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications 191, 192 to the cloud provider system 104. In some implementations, the data may be provided to the cloud provider 104 and stored in an image repository 106, in an image repository 106 located on each host 110, 120, or in an image repository 106 located on each node 111, 112, 114, 116. This data may be used for the execution of applications for a multi-tenant PaaS system managed by the PaaS provider controller 140.

In one implementation, the data used for execution of applications 191, 192 includes application images built from pre-existing application components and source code of users managing the application. As discussed above, an image refers to data representing executables and files of the application used to deploy functionality for a runtime instance of the application. In one implementation, the image can be built using a Docker™ tool and is referred to as a Docker image. In other implementations, the application images can be built using other types of containerization technologies. An application image may be built in the PaaS system using an image build system (not shown) of the PaaS system. The image build system may be provided on components hosted by cloud 130, on a server device external to the cloud 130, or even run on nodes 111, 112, 114, 116. The image build system generates an application image for an application 191, 192 by combining pre-existing ready-to-run application image corresponding to core functional components of the application (e.g., a web framework, database, etc.) with source code specific to the application 191, 192 provided by the user. The resulting application image may be pushed to an image repository (not shown) for subsequent use in launching instances of the application images for execution in the PaaS system.

Upon receiving a command identifying specific data (e.g., application data and files, such as application images, used to initialize an application 191, 192 on the cloud 130) from the PaaS provider controller 140, the cloud provider 104 retrieves the corresponding data from the image repository 106, creates an instance of it, and loads it to the host 110, 120 for execution by nodes 111, 112, 114, 116. In addition, a command may identify specific data to be executed on one or more of the nodes 111, 112, 114, and 116. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

The PaaS system 100 allows the applications 191, 192 to run within a container image 1 through N 151, 152, 154, 156 that can be can be built by using containerization (e.g., Docker™) tools or other type of other types of containerization technologies. A container image 151, 152, 154, 156 can include information that relates to an executable code that is to be deployed when the contained image is launched, and information that relates to the functionality of the executable code. For example, a developer using the PaaS system controller 140 can execute a command to build a container image 151, 152, 154, 156, validate functionalities of the container images 151, 152, 154, 156, and then publish the container images 151, 152, 154, 156 into an image registry 107 (e.g., a data store). Other operators (e.g. users or systems) of the PaaS system 100 can download container images 151, 152, 154, 156 from the image registry 107 to instantiate respective containers in a particular system environment, such as one of the nodes 1 through N 111, 112, 114, 116.

As shown in FIG. 1, the PaaS system 100 may include a test manager component 145 that is installed to determine an optimal execution environment (e.g., nodes 1 through N 111, 112, 114 or 116) for the containerization of applications in one or more of the containers 1 through N 151, 152, 154, 156. For example, the test manager component 145 may trigger a test controller 143 to determine how or if an application should be containerized in a production environment. In this regard, the nodes 111, 112, 114 or 116 provide a full or partially isolated execution environment for the execution of an application. The production environment may be a particular system node (e.g., nodes 1 through N 111, 112, 114 or 116) in which the application in a container (or other executable code) is executable during actual use by an end user client 160, 170, 180. While various implementations are described in terms of the environments disclosed herein, the facility may be implemented in a variety of other environments including a single, monolithic computer system, as well as various other combinations of computer systems or similar devices connected in various ways. For example, the test manager component 145 may be running on a node of the PaaS system 100 hosted by cloud 130, or may execute external to cloud 130 on a separate server device.

In some implementations, the test controller 143 and the test manager component 145 may include more components than what is shown that operate in conjunction with the PaaS system 100. In another implementation, the container images 151, 152, 154, 156 may run directly on a physical host 110, 120 instead of being instantiated on nodes 111, 112, 114, 116. In some implementations, an environment other than a VM may be used to execute the functionality of the applications 191, 192.

The test manager component 145 initially instructs the PaaS system controller 140 to install the test controller 143 to configure a container 151 in a testing environment, such as one of the nodes 111, 112, 114 and 116, to analyze the execution of a particular application 191, 192 to be containerized. For example, the testing environment for application 191 may be node 111 in cloud 130. This testing environment is used to isolate an execution of the application 191 so as not to impact a production environment associated with the system 100. The container 151 initially may only include partial isolation features (such as restricting certain resource access or privilege setting) to test the containerization limits of the application 191.

Then, the test controller 143 executes the application in a "monitoring mode." In this monitoring mode, a monitoring component 147 (e.g., an application program) of the test controller 143 is used to intercept event data 149 and gather event data 149 related to how the application 191 interacts with, for example, underlying system resources 113 (e.g., network ports, memory, devices, files, processors, etc.) of the host machine 110. For example, the monitoring component 147 may intercept event data 149 (e.g., intercepts system calls, I/O calls, memory allocation request etc.) by utilizing a system call filter/tracer/auditor, a driver running in the user space and/or kernel space, etc.).

To gather the event data 149, the monitoring component 147 may, for example, intercept system calls made by the application 191 which may return informative exit codes defined by the operating system 115. Through system calls, the monitoring component 149 may gather data about application 191 for containerization. For example, the intercepted system calls may indicate which devices and files are accessed (including network sockets to determine if the application 191 uses network and in what way). The monitoring component 149 may also intercept certain system calls and determine which operating system 115 capabilities are needed for the application 191 based on the intercepted system calls.

In some implementations, the test controller 143 may inject the monitoring component 147 into the same container 151 as the application 191, or the monitoring component 147 may be executed outside of the container 151 but has the ability to control the processes running within the container 151. In some implementations, the test controller 143 may inject the monitoring component 147 outside of the container 151 in situations where the application 191 shares data with another application in a different container or process outside of the container 151. For example, the application 191 may expose one or more network ports or use a network mount point to communicate with the other container.

After the monitoring component 147 is injected into the testing environment 111, the test controller 143 may execute a series of execution test component(s) 142 to apply to the application. In some implementations, the execution test component(s) 142 may be a set of individual monitoring modules which can be configured to separately test for specific application functionality, such as for a new release of the application. The function of the execution test components 142 is to simulate a production usage of the application 191 to allow the monitoring component 147 to gather a wide range of event data 149. The event data 149 may include detected events regarding interactions of the application 191 with the system resources 113.

As the test controller 143 applies the execution test components 142 to the application 191, the monitoring component 147 collects event data 149 relevant and specific for the application 191 during the simulated execution. This event data 149 may include, but not limited to, a list of used system calls—by intercepting system calls made by the application 191 during testing, whether the application 191 performs filtering of kernel system calls (e.g. seccomp), whether the application 191 overcomes (e.g., Linux™) namespaces on the system based on monitoring system resources used by the application, whether the application 191 limits/modifies available system resources (e.g. cgroups), operating system capabilities list, devices and system files utilization list, detection of MAC (Mandatory Access Control) usage (e.g., SELinux™ or AppArmor™ or others), used network connection and ports which are exposed if the application 191 interacts with some network service (in a client or server role), and system users and groups (any other than root) that are used by the application 191 as well as other type of event data 149.

The test controller 143 uses the event data 149 to map the application's behavior in the test environment 111 to the application's production behavior. The event data 149 may indicate a break or limit in an execution of the application 191 within the container 151 of the test environment 111. For example, in some systems by default each of the containers on the system run in separate namespaces. In such cases, If application 191 needs to utilize inter-process communication (IPC) with other processes running on host 110, the IPC will not work because the application 191 is spawned by setting a certain flag (e.g., CLONE_NEWIPC) which tells the operating system 115 to run it in a completely new IPC namespace separated from the host processes.

To overcome the detected limitations, container 151 can be configured to run the application 191 without the flag being set so that the application 191 can communicate with other processes on the host. As such, the event data 149 is later used by the test controller 143 to determine whether the application can execute properly if containerized and to further adjust conditions of the testing environment. For example, the test controller 143 may adjust the monitoring component(s) 147 to collect additional data related to the gathered event data 149. In other examples, the test controller 143 to introduce some more partial isolation features (such as restricting certain resource access or privilege setting) in the testing environment 111 of the application 191 to further test the containerization limits of the application 191.

In view of the gathered event data 149, the test controller 143 may generate an application monitoring report 146 as an outcome of the tests. The application monitoring report 146 includes information regarding what an application may need to run properly. The gathered event data 149 used to generate the report 146 may then be compared by the test manager component 145 with the containerization technology specification to identify possible problems or limitations that can be resolved by using certain containerization or environment options (such as an application that needs ports 80 and 8080 to be exposed to the external network through the containerization configuration for the application). The application monitoring report 146, in implementations, may be presented to a user via a user interface, such as in browser 161, 171, 181. An example of the application monitoring report 146 is as follows:

| Application monitoring report: for Application 191 | |
|---|---|
| List of kernel system calls: (indicates what system calls were made by an application during test run) | mount clone adjtimex ... |
| Linux namespaces status: (indicates what namespaces are OK to be isolated from the host and what namespaces are to be shared with the host because of the application) | CLONE_NEWPID • detected breakage: your application will not be able to see all the host processes from a container CLONE_NEWUTS • OK CLONE_NEWIPC • OK CLONE_NEWNET • detected breakage: your application is not able to perform IPC through DBus with other processes running on the host system CLONE_NEWNS • OK CLONE_NEWUSER • OK |
| Operating system capabilities: (indicates all of the detected OS capabilities needed by the application to run properly) | CAP_CHOWN CAP_NET_ADMIN CAP_SYS_ADMIN ... |
| Used devices and system files list: (indicates accessed/needed devices and files list) | Devices: /dev/null /dev/tty /dev/urandom /dev/kvm ... Files: /var/log ... |
| MAC (Mandatory Access Control) utilities used by the application: (indicates whether SELinux/AppArmor support is not needed by the application) | NO |
| Application uses network access: (indicates detectable network accesses by the application) | YES |
| Application provides network service: (indicates detectable network services and ports need by the application) | YES • On ports: - 80 - 8080 |
| System users and groups (any other than root): (indicates if an application is expected to be run under a particular user, such as root, or with other user or group identifiers) | NO |
| Application filters certain system calls (seccomp): (indicates which system calls are disabled by an application - these system calls need to be disabled for a container because seccomp cannot be used inside a container - filtering is therefore needed to be migrated to the containerization technology level) | YES • reboot |

-continued

| Application monitoring report: for Application 191 | |
|---|---|
| Application limit/modify available system resources: (indicates if the application needs to be configured with some system resources limitations) | YES • application memory usage is limited to 100 MB (using cgroups) |

Based on gathered event data 149 used to generate the monitoring report 146, the test controller 143 may produce one or more attributes 148 that indicate suitable containerization and environment options for the tested application 191. For example, the event data 149 may reveal an unexpected issue or restraint on the execution of the application 191 during the tests as indicated in the monitoring report 146. In such cases, the test controller 143 may determine one or more attributes to update the application container and/or the testing environment for executing the application to remove the unexpected issue or restraint without violating some system policy related to underlying host system.

The attributes 148, in implementations, may indicate that the test controller 143 should be executed within the testing container 151 or that the test manager component 145 should update the testing environment by placing the test controller 143 outside of the testing container 151 (such as in container 152) but with full control of the processes running within the container 151. For example, the test controller 143 may be placed outside testing container 151 when the gathered event data 149 indicates that application 191 is sharing data outside of the container 191 with another system process running on the host. In some implementations, the attributes 148 may indicate that the test manager 149 should place the test controller 143 within another container 152 on the host 110 when the gathered event data 149 shows that the application is providing a network service that can be tested through network 102.

The attributes 148 may also provide certain containerization options to update the configuration of the container 151 to optimal execute the application 191 in system 100. These updates may remove the restraints on the application 191 when executed in the application container 151. In one example, the attributes 148 may represent a first containerization option for generating a (normal) container for the application 191 that includes application specific configurations as determined based on the gathered event data 149. In another example, the attributes 148 may represent a second containerization option for generating a (privileged) container for the application that may be fully privileged also referred to as a Super-Privileged Container (SPC) with full system privileges or partially privileged with certain selected limitation as allowed by the containerization technology.

To update the configuration of the container 151, a privilege level for operations executed by the application in the application container may be adjusted from a container with certain privileges to a fully privileged container such as an SPC. In another example, user or group permissions with regard to an account associated with the application container may be modified so that the application 191 can reach certain resources or execute certain operations it could not before access. Even further, other configuration setting of the container 151 may be updated in accordance with the attributes 148. In yet another example, the attributes 148 may represent a third containerization option indicating that that the application 191 should not be executed within a container. In such cases, it may be better that the application 191 and/or the whole testing process is moved into an isolated environment in a fully virtualized (or bare metal) machine.

In some implementations, the test manager component 145 may determine if is acceptable to update the container 151 in accordance with the attributes 148. For example, the updated container 151 may allow the application 191 to overcome certain restrictions associated with a container policy of the production environment. The container policy may be a set of rules associated with a containerization tool (e.g., Docker™) used by the PaaS system 100. For example, the container policy may not allow certain containers on the system to become privileged because it may open a security flaw in the system 100. In such cases, the test manager component 145 may determine whether the update to the container 151 is in compliance with the container policy of PaaS system 100 by comparing the updates to the container 151 with the container policy specified by the containerization tool of the system.

If it is determined that the update is in compliance with the container policy, the test manager component 145 may instruct the PaaS system controller 140 to generate an instance of the application 191 to be used in the updated container 151, for example, in the production environment. Otherwise, the test manager component 145 may indicate to the PaaS system controller 140 that application 191 is not suitable for containerization.

Figure 2:
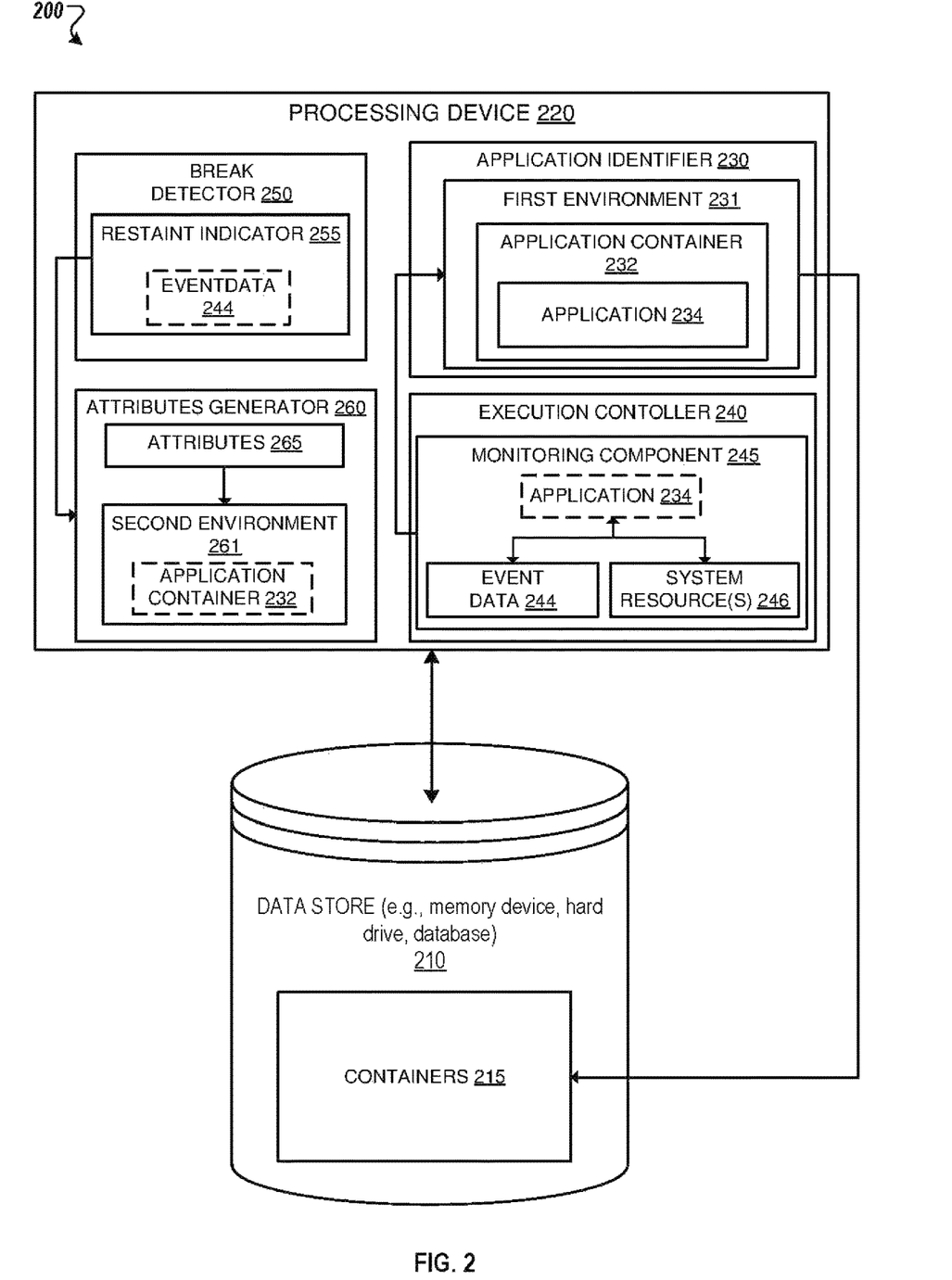
FIG. 2 is a block diagram of an apparatus including a memory to enable attributes for containerization of applications according to an implementation of the disclosure.

FIG. 2 is a block diagram of an apparatus including a memory for enabling attributes for containerization of applications in accordance with the disclosure. The apparatus 200 may be the same or similar to a components within the computer system 100 of FIG. 1. In some implementations, the apparatus 200 may include processing device 220, operatively coupled to memory 210 to execute instructions for carrying out the operations as discussed herein. As shown, the apparatus 200 may execute instructions for an application identifier 230, execution controller 240, a break detector 250, and an attributes generator 260 that provides attributes for generating an optimal execution environment for applications in the application containers.

Data store 210 may include any non-persistent data storage (e.g., memory), persistent and/or volatile data storage (e.g., flash storage, hard drive, tape), other medium, or combination thereof that is capable of storing instructions for carrying out the operations of the apparatus 200 discussed herein. In some implementations, the data store 210 may store data for executing a number of applications. For example, the data store 210 stores a plurality of application containers 215 for executing the applications. An "application" refers to any combination of software and hardware products that may perform a desired function. In some cases, an application may be a single software program that operates with a hardware platform. Some applications may use multiple software components, each of which may be written in a number of different programming languages and may execute a plurality of different application processes on the hardware platform. A "container" refers to a secure environment that isolates an execution of the application from other processes on a system.

In operation of apparatus 200, the application identifier 230 identifies an application 234 to execute in an application container 232 associated with a first environment 231. For example, the first environment 231 may be a testing environment for application 234. This first environment 231 is used to isolate an execution of the application 234 so as not to impact the system associated with the apparatus 200. The application container 232 initially may only include partial isolation features (such as restricting certain resource access or privilege setting) to test the containerization limits of the application 231.

The execution controller 240 injects a monitoring component 245 into the first environment 231 to collect event data 244 associated with an interaction of the application 234 with one or more system resources 246. For example, the application 234 is executed in a "monitoring mode" by injecting the monitoring component 245 into the testing environment 231 to intercept events 244 and gather data related to how the application 234 interacts with the system resources 246. In some implementations, the execution controller 240 receives a plurality of execution tests to apply to the application 234. These execution tests are used to identify a range of events that can be used to map the applications behavior (e.g., interactions with the system resources) in the test environment to its production behavior. The event data 244 may include, but not limited to, a list of system calls, devices, files and other resources accessed by the application, whether the application utilizes a filter for system calls, whether the application limits or modifies system resources, whether the application 234 uses a type of MAC (Mandatory Access Control) to access certain resource or used system user identifiers or group as well as other type of event data 244.

The break detector 250 may identify an indication of a restraint 255 on an execution of the application 234 using the collected event data 244. This restraint 255 causes a break in the execution of the application 234. These restraints 255 may include certain permissions on resources the application 255 need to access to functional properly. For example, the event data 244 may reveal an unexpected issue or limitation on the execution of the application 191 during the tests.

The attributes generator 260 generates one or more attributes 265 to update the application container 232 to execute the application 234 in a second environment 261 (e.g., a production environment) in view of the restraint 255. For example, the one or more attributes 265 may indicate that the container 232 for the application 234 should be, a container without any limitations, a type of privileged container with certain modifications (e.g., extended user/system privileges) to overcome the restraints, or that no container should be used to execute the applications 234. In some implementations, the attributes 265 may be used to update the configuration of the container 232 to optimal execute the application 234 in the production environment 261. These updates may remove the restraints 255 on the application 234 when executed in the application container 232. In one example, a privilege level for operations executed by the application in the application container may be adjusted from a container with certain privileges to a fully privileged container such as a Super-Privileged Container (SPC). In another example, user or group permissions with regard to an account associated with the application container 232 may be modify so that the application 234 can reach certain resources or execute certain operations it could not before access.

Figure 3:
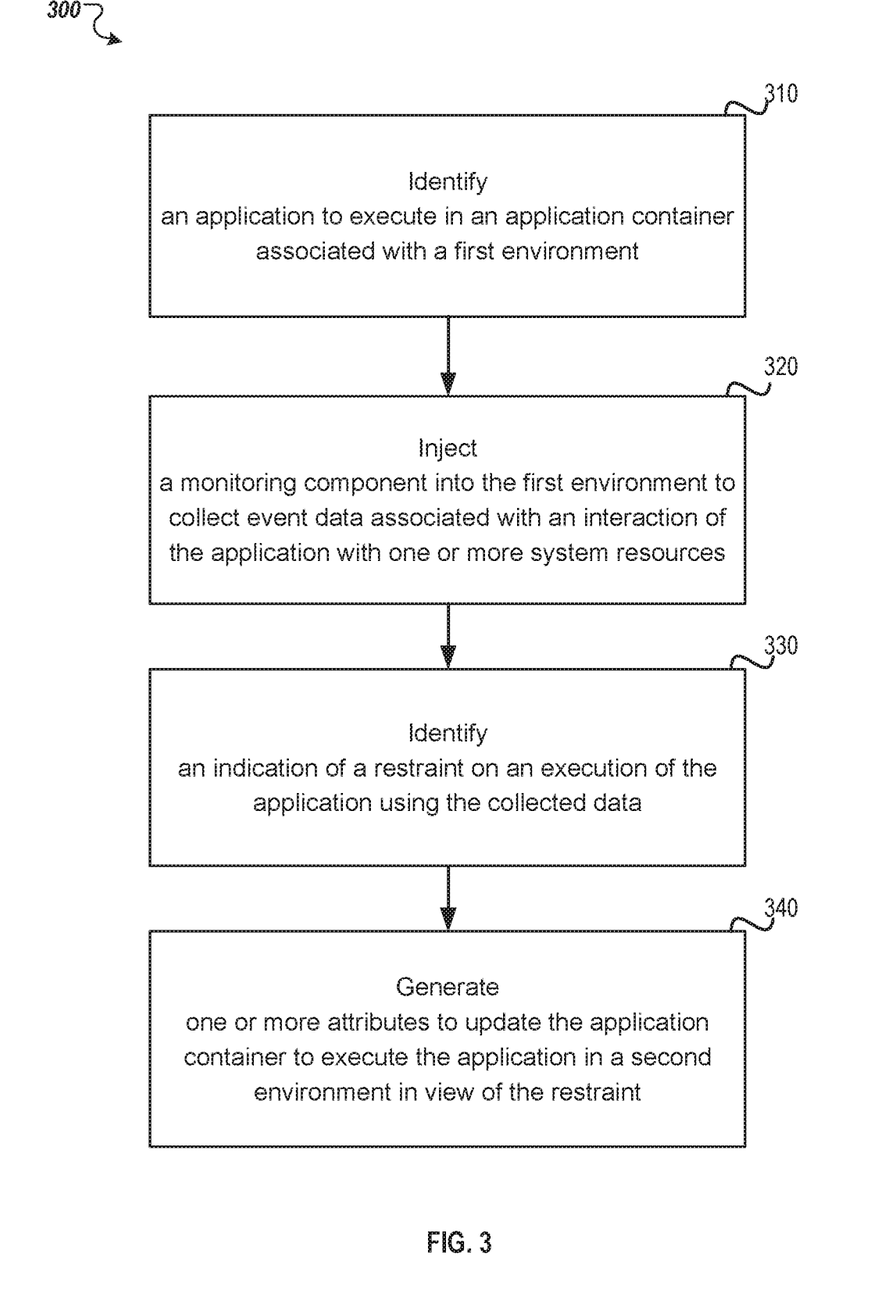
FIG. 3 illustrates a flow diagram of a method of enabling attributes for containerization of application according to an implementation of the disclosure.

FIG. 3 depicts a flow diagram of one implementation of a method 300 in accordance with one or more aspects of the disclosure. In one implementation, a processing component (such as the test controller 143 and test manager component 145) of FIG. 1 and/or the processing device 220 of FIG. 2 may perform method 400 of FIG. 4 for enabling attributes for containerization of applications according to an implementation of the disclosure. The method 300 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 300 and each of its individual functions. In certain implementations, a single processing thread may perform method 300. Alternatively, two or more processing threads with each thread executing one or more individual functions, routines, subroutines, or operations may perform method 300. It should be noted that blocks of method 300 depicted in FIG. 3 can be performed simultaneously or in a different order than that depicted.

Referring to FIG. 3, at block 310, method 300 identifies an application 234 to execute in a container 232 of a first environment 231. A monitoring component 245 is injected in block 320 into the first environment 231 to collect event data 244 associated with an interaction of the application 234 with one or more system resources 246. An indication 255 of a restraint on an execution of the application 234 is identified in block 330 using the collected event data 244. The restraint causes a break in the execution of the application 234. In block 340, one or more attributes 265 are generated in view of the restraint to update the application container 232 for executing the application 234 in a second environment 261. The one or more attributes 265 remove the restraint on the execution of the application 234 in the application container 232 of the second environment 261.

Figure 4:
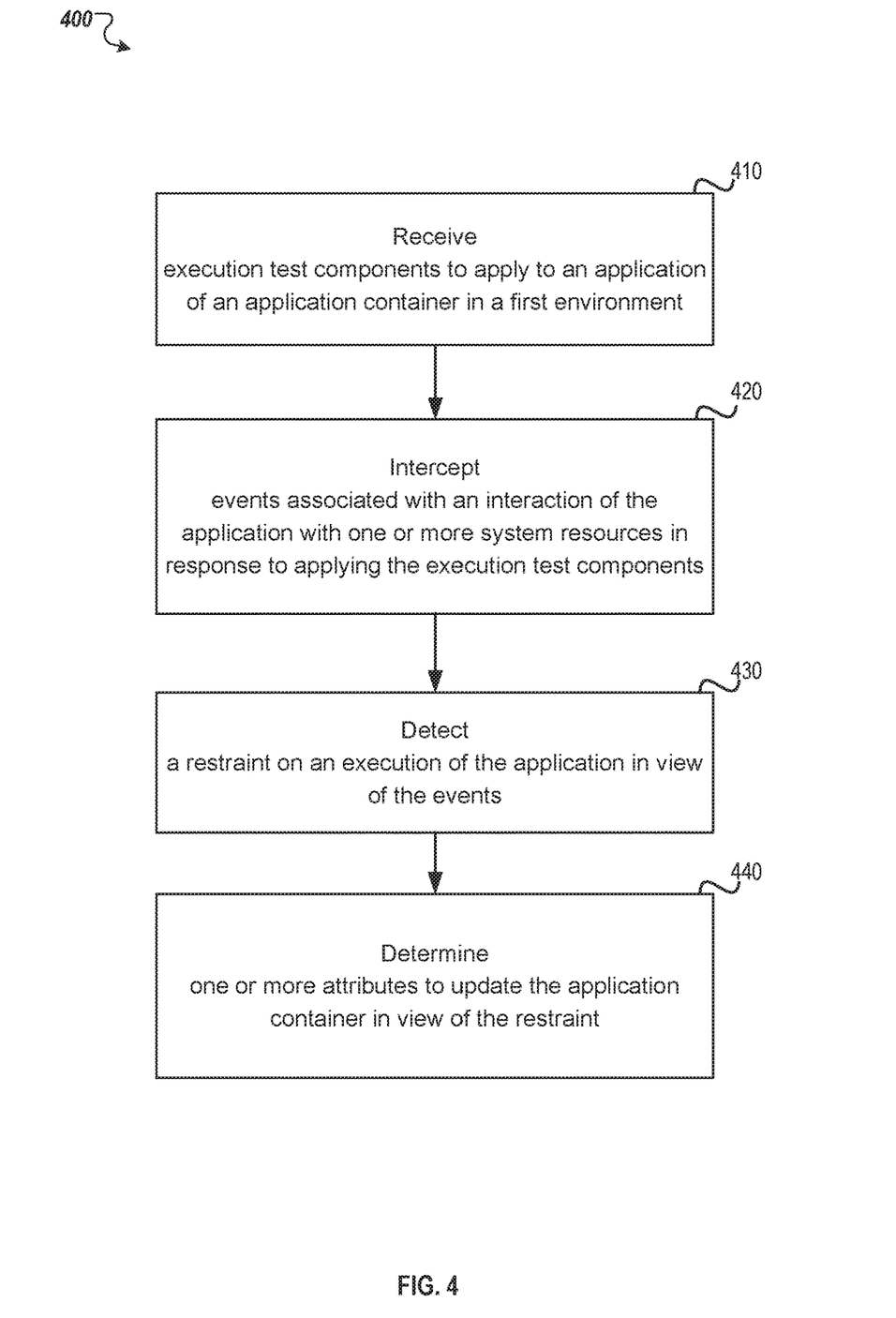
FIG. 4 illustrates a flow diagram of a method of enabling attributes for containerization of applications according to an implementation of the disclosure.

FIG. 4 depicts a flow diagram of one implementation of a method 400 in accordance with one or more aspects of the disclosure. In one implementation, a processing component (such as the test controller 143 and test manager component 145) of FIG. 1 and/or the processing device 220 of FIG. 2 may perform method 400 of FIG. 4 for enabling attributes for containerization of applications. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 receives execution tests 142 to apply to an application 191 of an application container 151 in a first environment 111. Responsive to applying the execution tests 142, events 149 associated with an interaction of the application 191 with one or more system resources 113 are intercepted in block 420. In block 430, a restraint in an execution of the application is detected in view of the events 149. Method 400 determines in block 440 one or more attributes 265 to update the application container 191 to remove the restraint associated with the execution of the application 191. In block 450, an instance of the application 191 to execute in a second environment 112 is generated in view of the update associated with the application container 151.

Figure 5:
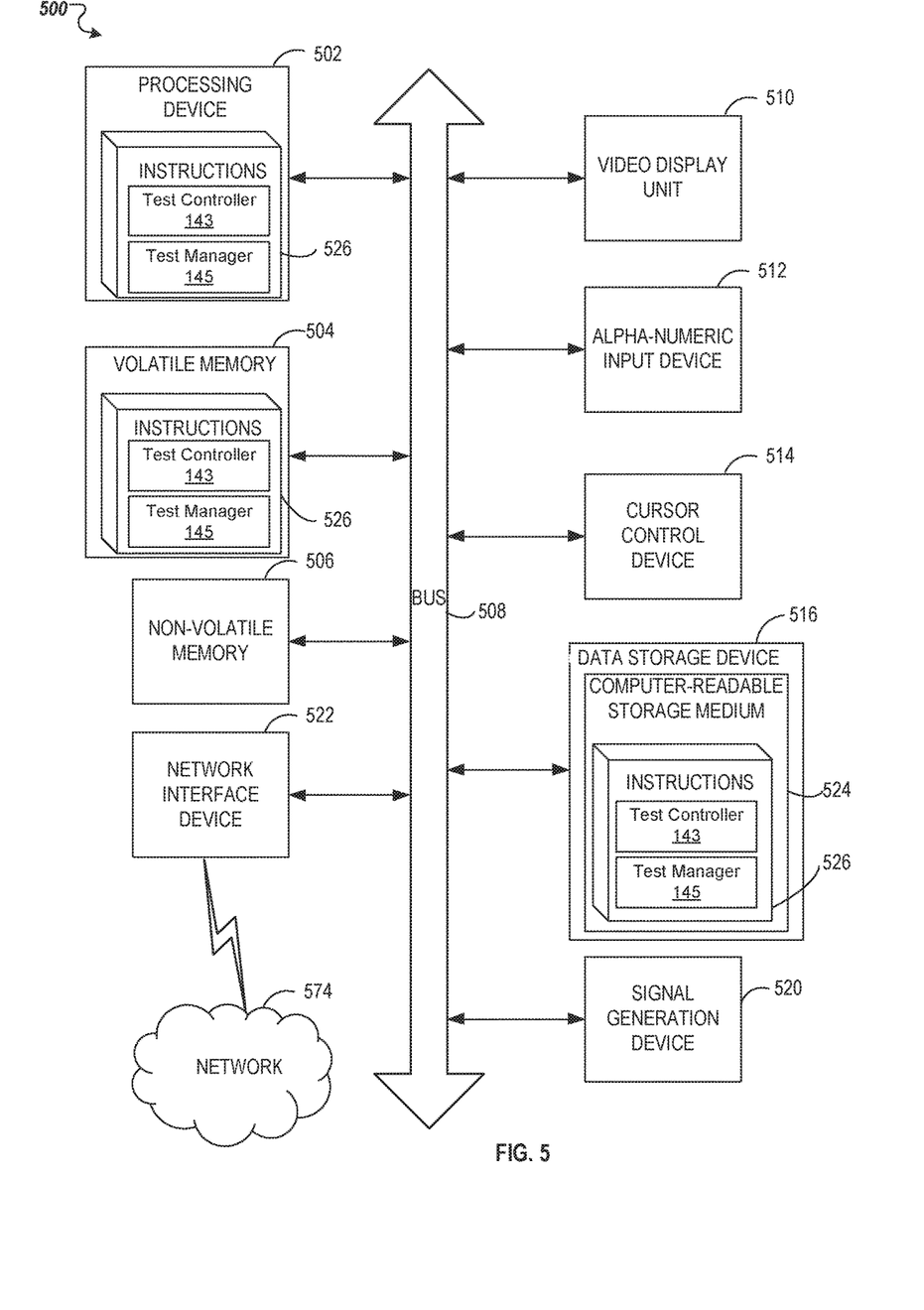
FIG. 5 illustrates a block diagram illustrating a machine in which implementations of the disclosure may be used.

FIG. 5 depicts a block diagram of a machine in the form of a computer system 500 within which a set of instructions for causing the machine to perform any one or more of the methodologies for enabling and utilizing resource attributes for application containers as discussed herein. In various illustrative examples, computer system 500 may correspond to system 100 of FIG. 1 or apparatus 200 of FIG. 2 respectively. The machine 500 may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network 574, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 or "processor" herein refers to a device capable of executing instructions encoding arithmetic, logical, or I/O operations. Although, for simplicity, a single processing device 502 is depicted in FIG. 1, in some other embodiments system 500 may comprise a plurality of processors. In one illustrative example, processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the test controller 143 and test manager 145 of FIG. 1 for implementing method 300 of FIG. 3 or method 400 of FIG. 4 to enable attributes for containerization of applications.

Instructions 526 may also reside, completely or partially, within volatile memory 504 and/or within processing device 502 during execution thereof by computer system 500, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "determining," "intercepting," "updating," "retrieving," "generating," "injecting," "detecting" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a non-transitory machine-readable medium having stored thereon instructions, which may be used to program a computer system (or other electronic devices) to perform a process according to the disclosure. A non-transitory machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus comprising:
   a memory; and
   a processing device, operatively coupled to the memory, to:
   identify an application to execute in an application container associated with a first environment;
   inject a monitoring component into the first environment to collect event data associated with an interaction of the application with one or more system resources;
   identify, using the collected event data and a containerization technology specification associated with the application container, an indication of a restraint that causes a break in an execution of the application; and
   generate one or more attributes for reconfiguration of application container to execute the application in a second environment by determining that the one or more attributes cause the restraint to be removed.

2. The apparatus of claim 1, wherein the one or more attributes to remove the restraint on executing the application from the application container of the second environment.

3. The apparatus of claim 1, wherein the processing device is further to adjust a privilege level for operations executed by the application in the second environment.

4. The apparatus of claim 1, wherein the processing device is further to modify permissions with regard to an account associated with the application container.

5. The apparatus of claim 1, wherein the processing device is further to:
   determine whether the one or more attributes to update the application container are in compliance with a container policy associated with the second environment; and
   generate an instance of the application to execute in the second environment in view of the determined compliance with the container policy.

6. The apparatus of claim 1, wherein the processing device is further to:
   determine, using the collected event data, whether the application is sharing data outside of the application container with another system process; and
   responsive to determining that the application in the application container is sharing data, inject the monitoring component into the first environment outside of the application container.

7. The apparatus of claim 6, wherein the processing device is further to, responsive to determining that the application in the application container is not sharing data, inject the monitoring component inside of the application container.

8. A method comprising:
   receiving, by a processing device, execution test components to apply to an application of an application container in a first environment;
   responsive to applying the execution test components, intercept, by the processing device, events associated with an interaction of the application with one or more system resources;
   detect, by the processing device, a restraint that causes a break in an execution of the application in view of the events and a containerization technology specification associated with the application container;
   determining, by the processing device, one or more attributes for reconfiguration of the application container in view of determining that the one or more attributes cause the restraint to be removed.

9. The method of claim 8, further comprising generating an instance of the application for the reconfigured application container of a second environment to remove the restraint on the execution of the application.

10. The method of claim 8, further comprising modifying permissions with regard to an account associated with the application container.

11. The method of claim 9, further comprising:
    determining whether the one or more attributes to update the application container are in compliance with a container policy associated with the second environment; and
    generating the instance of the application to execute in the second environment in view of the determined compliance with the container policy.

12. The method of claim 8, further comprising:
- determining, using the intercepted events, whether the application is sharing data outside of the application container with another system process; and
- responsive to determining that the application in the application container is sharing data, injecting a monitoring component into the first environment outside of the application container.

13. The method of claim 12, further comprising, responsive to determining that the application in the application container is not sharing data, injecting the monitoring component inside of the application container.

14. A non-transitory computer-readable medium comprising instructions that, when executed by a processing device, cause the processing device to:
- identify, by the processing device, an application to execute in an application container associated with a first environment;
- inject a monitoring component into the first environment to collect event data associated with an interaction of the application with one or more system resources;
- identify, using the collected event data and a containerization technology specification associated with the application container, an indication of a restraint that causes a break in an execution of the application; and
- generate one or more attributes for reconfiguration of the application container to execute the application in a second environment by determining that the one or more attributes cause the restraint to be removed.

15. The non-transitory computer-readable medium of claim 14, wherein the one or more attributes to remove the restraint on executing the application from the application container of the second environment.

16. The non-transitory computer-readable medium of claim 14, wherein the processing device is further to adjust a privilege level for operations executed by the application in the second environment.

17. The non-transitory computer-readable medium of claim 14, wherein the processing device is further to modify permissions with regard to an account associated with the application container.

18. The non-transitory computer-readable medium of claim 14, wherein the processing device is further to:
- determine whether the one or more attributes to update the application container are in compliance with a container policy associated with the second environment; and
- generate an instance of the application to execute in the second environment in view of the determined compliance with the container policy.

19. The non-transitory computer-readable medium of claim 14, wherein the processing device is further to:
- determine, using the collected event data, whether the application is sharing data outside of the application container with another system process; and
- responsive to determining that the application in the application container is sharing data, inject the monitoring component into the first environment outside of the application container.

20. The non-transitory computer-readable medium of claim 19, wherein the processing device is further to, responsive to determining that the application in the application container is not sharing data, inject the monitoring component inside of the application container.

* * * * *